United States Patent [19]
Guasch

[11] Patent Number: 5,186,210
[45] Date of Patent: Feb. 16, 1993

[54] FLUID PRESSURE REGULATING VALVE

[75] Inventor: Esteve C. Guasch, Mataro Barcelona, Spain

[73] Assignee: Bendix Espana S.A., Barcelona, Spain

[21] Appl. No.: 775,867

[22] Filed: Oct. 15, 1991

[30] Foreign Application Priority Data

Nov. 19, 1990 [ES] Spain .................................. 9002919

[51] Int. Cl.$^5$ .......................................... F15B 13/044
[52] U.S. Cl. ............................ 137/596.17; 137/625.65
[58] Field of Search ...................... 137/596.17, 625.65

[56] References Cited
U.S. PATENT DOCUMENTS 4,757,836 7/1988 Bacardit ............................. 137/115
4,819,695 4/1989 Kervagoret ................. 137/116.3 X

FOREIGN PATENT DOCUMENTS 0112209 6/1984 European Pat. Off. .

Primary Examiner—Gerald A. Michalsky
Attorney, Agent, or Firm—Larry J. Palguta; Ken C. Decker

[57] ABSTRACT

A fluid pressure regulating valve has an inlet (10) connected to a pressurized fluid source (12) and an application outlet (14). It comprises a reference piston (30) one face of which is biased by a reference force, and a regulating piston (42) upon one face of which is applied the fluid pressure at the application outlet (14). The regulating piston (42) acts as a slide valve between the inlet (10), the application outlet (14), and a low pressure fluid reservoir (18). The other faces of the pistons (30, 42) each bias a respective end of a lever (60) the fulcrum (62) of which is movable between its ends according to the biasing force generated by each of the pistons (30, 42). Such a valve is useful for power steering for vehicles.

9 Claims, 1 Drawing Sheet

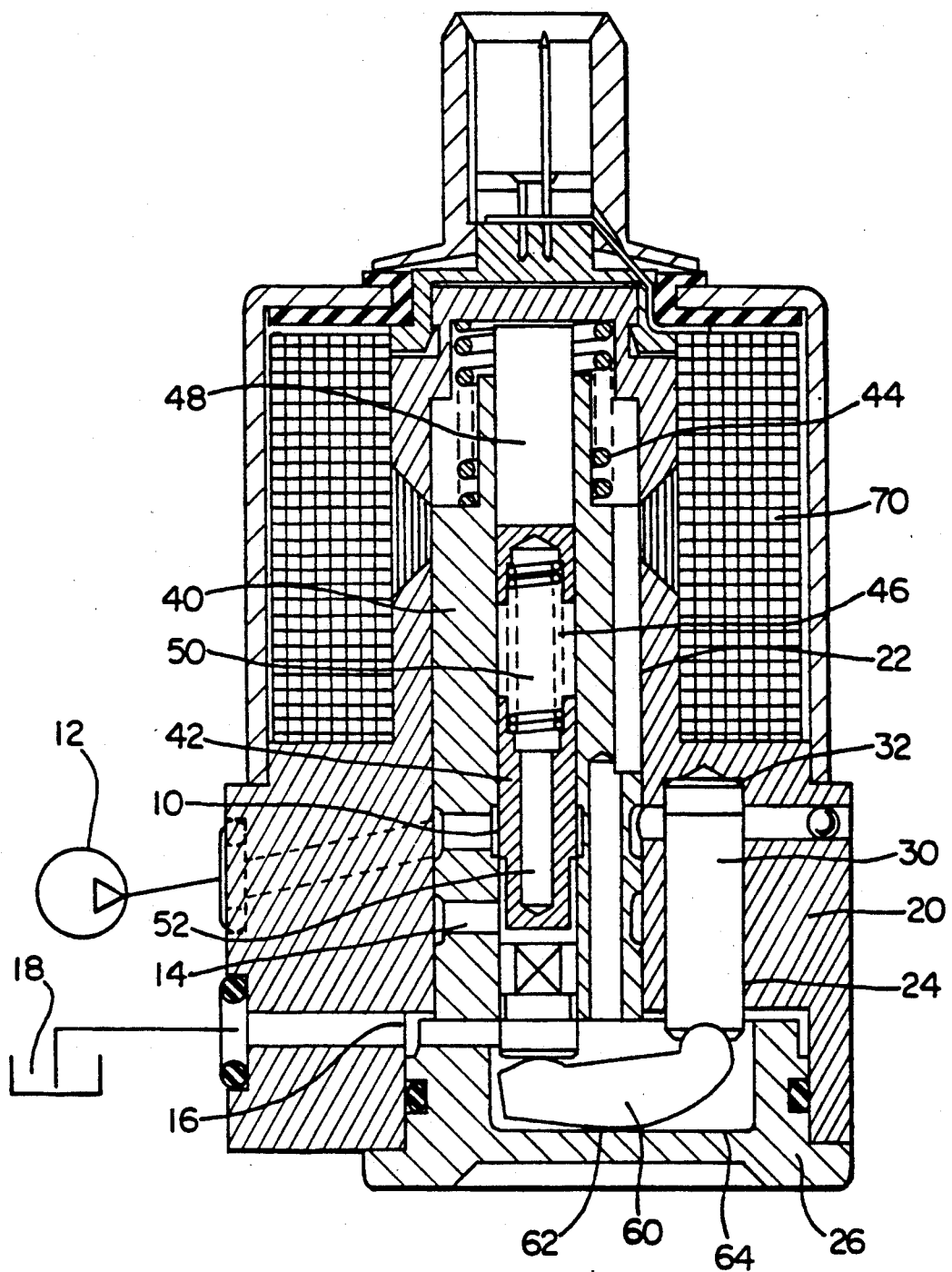

FLUID PRESSURE REGULATING VALVE

BACKGROUND OF THE INVENTION

The invention relates to a fluid pressure regulating valve and, more particularly, to a valve regulating the pressure of a hydraulic fluid so that the output pressure be held constant, the level of which being eventually electrically controlled.

Although the valve of the invention has been particularly designed for incorporation in power steering for vehicles, it may be applied in any hydraulic circuit requiring the achieved functions.

In the Prior Art, for instance disclosed by EP-A-0 112 209, valves achieving the same functions require a permanent fluid flow between the pressurized fluid source and the reservoir through variable restrictions. This results in bulky and onerous pump and components.

SUMMARY OF THE INVENTION

An object of this invention is to obviate this disadvantage.

Another object of this invention is to enhance pressure regulating valves, particularly for power steering for saving costs and space on performing the function.

These objects are reached according to one aspect of this invention with a fluid pressure regulating valve comprising a reference piston one face of which is biased by a reference force, and a regulating piston upon one face of which is applied the fluid pressure at the application outlet, the regulating piston acting as a slide valve between the inlet, the application outlet, and a low pressure fluid reservoir, the other face of both pistons biasing a respective end of a lever the fulcrum of which is movable between the lever ends according to the biasing force generated by each piston.

According to another aspect of this invention, it is provided a fluid pressure regulating solenoid valve comprising:
- a reference piston upon one face of which is applied the fluid pressure at the inlet;
- a regulating piston upon one face of which is applied the fluid pressure at the application outlet, this regulating piston acting as a slide valve between the inlet, the application outlet and a low pressure reservoir;
- a curved rocker arm the two ends of which are respectively biased by the other face of the pistons, and the fulcrum of which is movable between the two lever ends according to the biasing forces generated by the pistons;
- a sleeve in which the inlet and the application outlet are provided and in which the regulating piston slides, and
- a solenoid coil controlling the location of the sleeve.

BRIEF DESCRIPTION OF THE DRAWINGS

The invention will be better understood and advantages and capabilities thereof will appear from the following description and accompanying drawing in which:

The Single FIGURE diagrammatically shows in cross-section a preferred embodiment of the invention.

DETAILED DESCRIPTION OF THE INVENTION

Reference is now made to one type of valve incorporating the invention, however it is understood that the invention is not limited thereto or thereby, and can be applied to other valves e.g. simplified regulating valves.

In the drawing, the fluid pressure regulating valve is a proportioning solenoid valve to be used in the power steering hydraulic circuit for providing an electronically variable steering wheel feel to the driver of the vehicle.

This valve is connected via an inlet 10 to a pressurized fluid source 12, for instance a pump having an accumulator, and via an outlet 14 to an application circuit (not shown), and via another outlet 16 to a low pressure reservoir 18. The valve has a body 20 in which two parallel bores 22, 24 are provided and closed by a cap 26.

Bore 24 slidably receives a reference piston 30 defining therewith a chamber 32 communicating with the inlet 10, and with the pressurized fluid source 12.

Bore 22 slideably receives a sleeve 40 in which slides a regulating piston 42. Both sleeve 40 and regulating piston 42 are biased in rest position by a respective spring 44, 46. A back piston 48 limits the volume of the chamber 50 defined in the sleeve 40 by the regulating piston 42. This chamber 50 communicates with the application circuit via the outlet 14 and an orifice 52 passing through the regulating piston 42.

This regulating piston 42 acts like a slide valve between the inlet 10 and the outlets 14 and 16.

The faces opposite to the chambers 32 and 50 of both pistons 30, 42 are engaged with the respective ends of a curved rocker arm 60 acting as a lever. This rocker arm 60 defines a movable fulcrum 62 with the corresponding internal support surface 64 of the cap 26.

A solenoid coil 70 is capable of inducing a magnetic field causing the sleeve 40 to move into the body 20, this resulting in a modification of the location of the inlet 10, of the application outlet 14 and the reservoir outlet 16.

This valve operates as follows. In rest position, in absence of electrical signal applied to the solenoid coil 70, chamber 32 is pressurized by the pressurized fluid source 12 and chamber 50 is pressurized by the application circuit. The assembly takes an equilibrium state depending of the cross-section of the pistons 30, 42 of the accurate shape of the rocker arm 60, and of the respective pressure in the chambers 32, 50. Pistons 30, 42 and the rocker arm 60 are designed in order that for a given pressure in the application circuit, i.e. in the chamber 50, the communication on one hand between the inlet 10 and the application outlet 14 and, on the other hand, between the application outlet 14 and the reservoir 18 are both closed, thus avoiding permanent fluid flow in the circuit.

If the pressure in the application circuit, i.e. in chamber 50 decreases, the reference piston 30 pushes the rocker arm 60 to turn and to lift the regulating piston 42, thus opening a communication between the inlet 10 and the outlet 14, thus increasing the pressure in the application circuit, i.e. in chamber 50. This results in that the assembly turns back to the aforesaid equilibrium state as soon as the pressure in chamber 50 is equal to the given pressure.

If for any reason, the pressure in the application circuit increases, the regulating piston 42 pushes the rocker arm 60 against the reference piston 30, thus opening a communication between the application outlet 14 and the reservoir 18. This results in that the assembly turns back to the aforesaid equilibrium state as soon as the pressure in chamber 50 is equal to the given pressure.

Thus a pressure regulating valve is actually achieved. But now, with the solenoid coil 70, this given pressure in the application circuit may be modified according to the electrical signal applied to the coil. Since the inlet 10 and the outlet 14 are provided into the sleeve 40, the accurate location of same depends of the location of sleeve 40, i.e. of the electrical signal applied to the coil 70. Since for each equilibrium state of the assembly, the regulating piston 42 has to occupy the same position relative to the sleeve 40, the location of the fulcrum 62 of the rocker arm 60 relative to the internal support surface 64 depends also of the electrical signal applied to the coil 70.

By giving an appropriate shape to the curved rocker arm 60, it is then easy to achieve a valve regulating the fluid pressure so that the pressure in the application circuit be proportional to the electrical signal. That means that the given pressure is controlled electrically (or electronically).

While only the preferred embodiment of the invention has been shown and described, it is obvious that a skilled man in the art may bring modifications to the invention without departing from the scope of the invention as defined in the appended claims.

For instance, chamber 32 may receive a helical prestressed spring for biasing the reference piston 30 instead of communicating with the pressurized fluid source 12. The internal support surface 64 of the cap 26 may be curved in order to improve the law between the application pressure and the electrical signal.

The regulating valve may also be designed to provide only two discrete application pressures. In this case, the solenoid is not of proportional type but of simplified type.

What we claim is:

1. A fluid pressure regulating valve having an inlet connected to a pressurized fluid source and an application outlet, and comprising a reference piston one face of which is biased by a reference force, and a regulating piston upon one face of which is applied the fluid pressure at the application outlet, said regulating piston acting as a slide valve between said inlet, said application outlet, and a low pressure fluid reservoir, other faces of said pistons each biasing a respective end of a lever the fulcrum of which is movable between said ends according to the biasing force generated by each of said pistons.

2. The fluid pressure regulating valve according to claim 1 wherein said pistons are parallel.

3. The fluid pressure regulating valve according to claim 2 wherein said lever is in form of a curved rocker arm.

4. The fluid pressure regulating valve according to claim 3 wherein the location of said fulcrum is determined by the shapes of said curved rocker arm and of a corresponding fixed support surface.

5. The fluid pressure regulating valve according to claim 1 wherein said reference force is generated by the fluid pressure at the inlet.

6. The fluid pressure regulating valve according to claim 1 wherein said inlet and said application outlet are provided within a sleeve in which said regulating piston slides, said sleeve being capable of sliding into a valve body under the effect of control means.

7. The fluid pressure regulating valve according to claim 6 wherein said control means is a solenoid coil.

8. The fluid pressure regulating valve according to claim 7 wherein an electrical signal applied to said solenoid coil determines the accurate location of said sleeve.

9. A fluid pressure regulating solenoid valve having an inlet connected to a pressurized fluid source and an application outlet, and comprising:
   a reference piston upon one face of which is applied fluid pressure at the inlet;
   a regulating piston upon one face of which is applied fluid pressure at the application outlet, said regulating piston acting as a slide valve between said inlet, said application outlet and a low pressure reservoir;
   a curved rocker arm having two ends which are respectively biased by other faces of said pistons and the fulcrum of which is movable between said two ends according to biasing forces generated by said pistons;
   a sleeve in which said inlet and said application outlet are provided and in which said regulating piston slides, and
   a solenoid coil controlling the location of said sleeve.

* * * * *